UNITED STATES PATENT OFFICE.

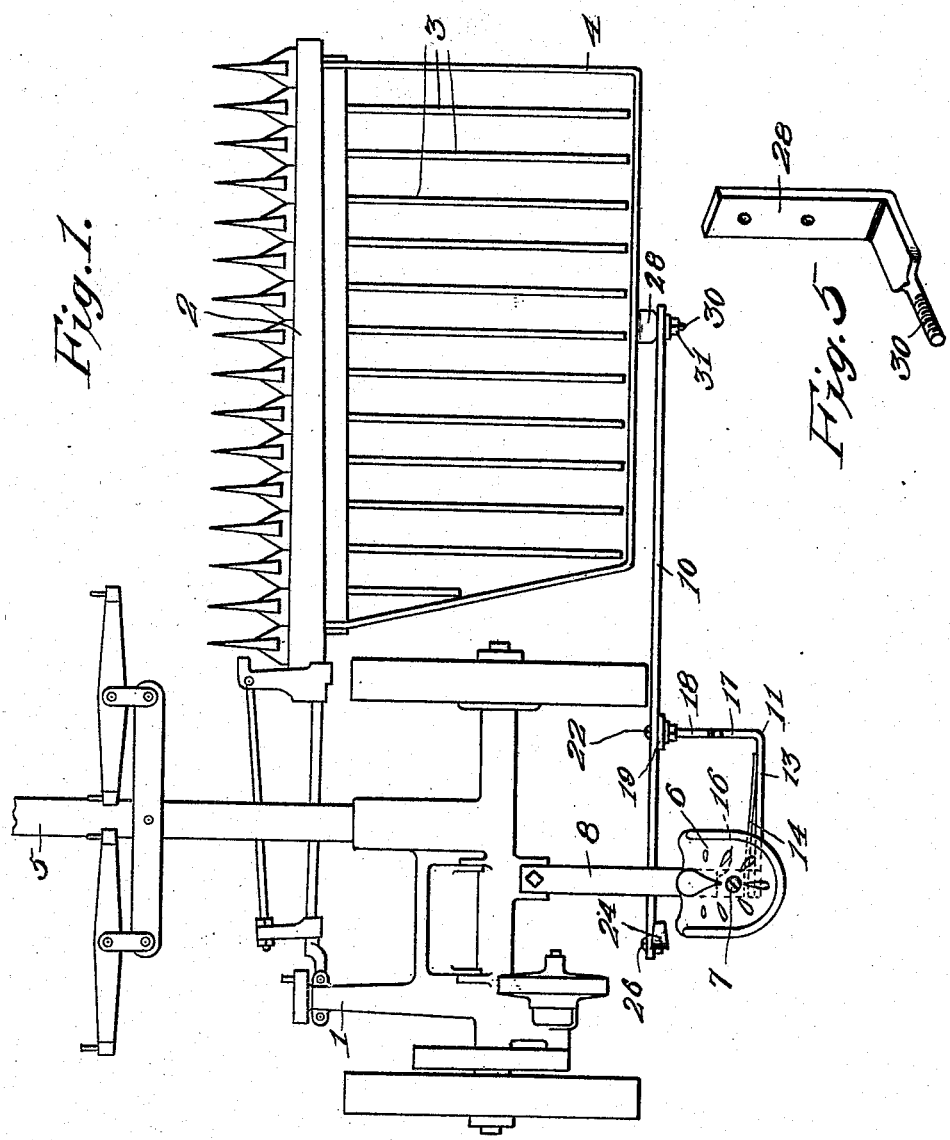

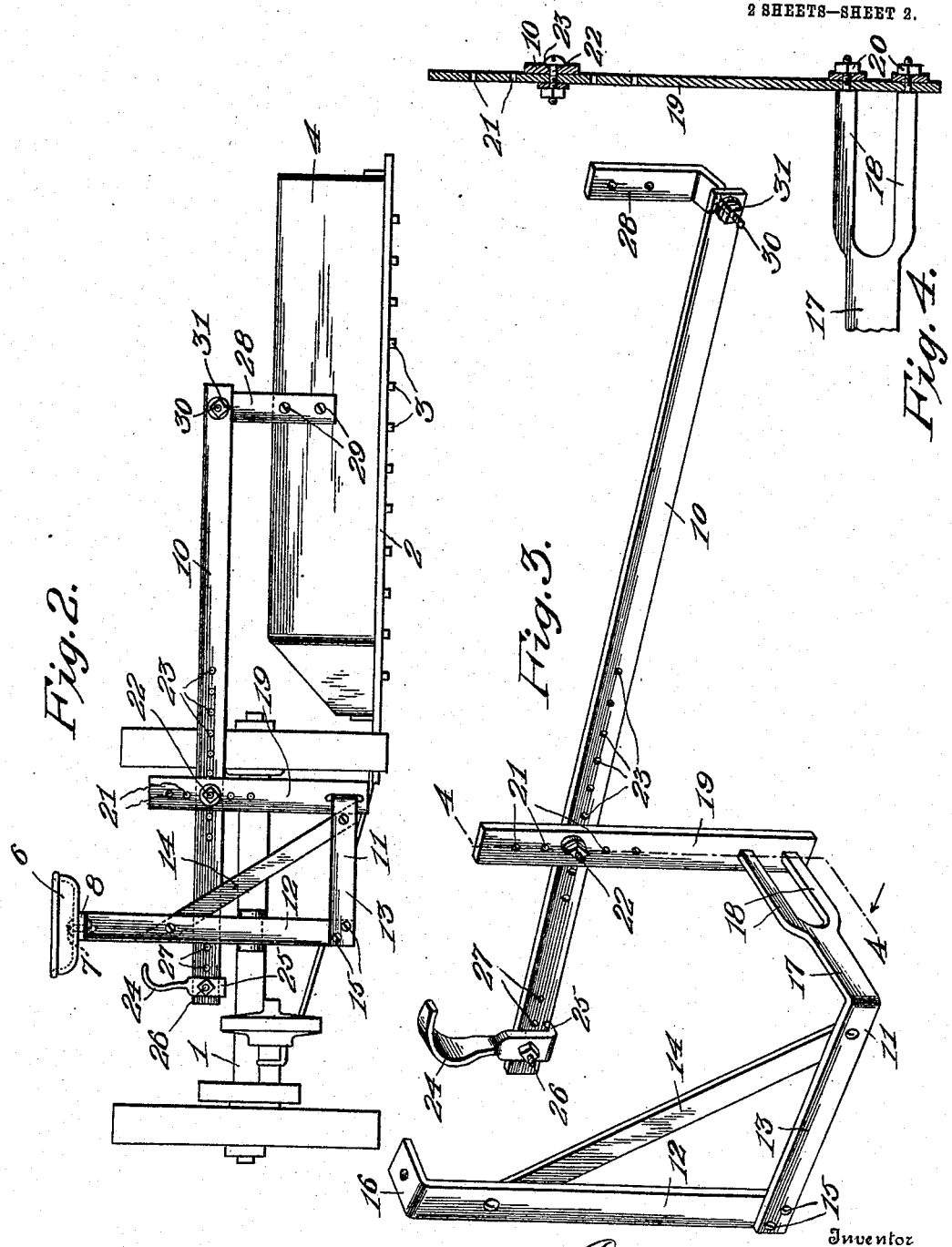

CHARLES A. RICE, OF RELIANCE, SOUTH DAKOTA.

GATHERING AND DROPPING DEVICE FOR MOWERS.

933,391.  Specification of Letters Patent.  Patented Sept. 7, 1909.

Application filed March 5, 1909. Serial No. 481,273.

*To all whom it may concern:*

Be it known that I, CHARLES A. RICE, a citizen of the United States, residing at Reliance, in the county of Lyman and State of South Dakota, have invented certain new and useful Improvements in Gathering and Dropping Devices for Mowers, of which the following is a specification, reference being had to the accompanying drawings.

This invention relates to improvements in hay and grain gathering and dropping devices for mowing machines and more particularly to a simple and practical foot operated dropping device which may be readily attached to any mowing machine for raising and lowering the dumping box or gate used on such machines.

The object of the invention is to provide an attachment of this character which is simple in construction, strong, durable and effective in use and easy to apply to any of the mowing machines now in use.

With the above and other objects in view, the invention consists of the novel features of construction and the combination and arrangement of parts hereinafter fully described and claimed, and illustrated in the accompanying drawings, in which—

Figure 1 is a plan view of portions of a mowing machine illustrating the application of the invention thereto; Fig. 2 is a rear elevation of the parts shown in Fig. 1; Fig. 3 is a perspective view of the foot controlled dropping attachment removed from the mower; and Figs. 4 and 5 are detail views.

In the drawings 1 denotes the frame of a mowing machine of the usual form having a cutting mechanism 2 to one side of said frame, a slatted platform 3 in rear of the cutting mechanism, a swinging dumping box or gate 4 at the rear of said platform, a draft tongue 5 and a driver's seat 6 secured by a bolt or similar fastening 7 to a seat support 8.

The invention comprises a transversely disposed lever 10 having one end connected to the dumping box or gate 4, its other end provided with a foot piece and its intermediate portion fulcrumed on a support or bracket 11 preferably secured beneath the seat 6. As illustrated, the support 11 consists of a vertical bar 12, a horizontal bar 13 and a diagonal brace 14. The horizontal bar 13 has one of its ends secured by bolts 15 to the lower end of the vertical bar 12 and the brace is bolted to the bars 12, 13, as clearly shown in the drawings, for the purpose of holding them in planes at right angles to each other. The upper end of the vertical bar 12 is bent at right angles, as shown at 16, and apertured to receive the bolt 7 which secures the seat to its support 8. By constructing and attaching the support or frame 11 in this manner, it will be seen that the invention may be readily attached to various kinds of mowing machines now in general use without altering the construction of such machines. The outer end of the horizontal bar 13 is bent at right angles to provide a forwardly extending portion 17, which latter is forked or bifurcated to provide upper and lower members or arms 18 to which are secured an upright bar or standard 19. To effectively secure the latter to the arms 18, said arms have their extremities reduced and screw threaded to project through openings in the lower end of the upright 19 and to provide shoulders for engagement by said upright, nuts 20 being provided upon the threaded portions of the reduced ends of the upright 19 to effectively secure the latter.

The lever 10 is fulcrumed upon the upright 19 and is preferably in the form of a straight bar of such length as to extend from the front of the operator laterally to the dumping box or gate 4. The fulcrum of said lever is preferably vertically adjustable whereby the lifting movement of the dumping box may be varied as desired, said adjustment of the lever being preferably formed by providing in the upright 19 a vertical series of openings 21 any one of which may receive a bolt 22 passing through the lever 10 and serving as a fulcrum for the same. In order to permit the device or attachment to be used upon mowing machines of different width, the lever 10 is also mounted for adjustment in a horizontal or longitudinal plane, this adjustment being effected by forming in the intermediate portion of the lever a longitudinal series of openings 23 any one of which may receive the fulcrum pin or bolt 22.

24 denotes a foot piece in the form of a metal plate having a curved upper end to project above the inner end of the lever 10 to receive the foot and an angular lower end 25 to engage one side and the bottom edge of said lever, to which latter the foot piece is secured by a bolt 26. Said foot piece is preferably made longitudinally adjustable upon the lever by providing in the inner end of the latter a longitudinal series of openings 27 any one of which may receive the fastening bolt 26.

The outer end of the lever 10 is pivotally or loosely connected to the dumping box or gate 4 preferably by providing an angle bracket 28, the depending or vertical end of which is bolted, as at 29, to the dumping box or gate 4 and the rearwardly projecting horizontal end of which is reduced to provide a pivot stud 30 which rotates in an opening in the lever 10 and which is retained therein by a nut 31 applied to its threaded extremity, as clearly shown in the drawings.

The operation of the invention will be readily understood upon reference to the drawings. It will be seen that when it is desired to elevate the dumping box or gate 4 to permit the accumulated grass, hay, grain or the like upon the slatted platform 3 of the mower to be discharged from the same, it is only necessary for the operator to engage his foot with the foot piece 24 and depress the inner end of the lever, whereupon, the outer end of the latter and the box or gate 4 will be elevated.

From the foregoing it will be seen that the invention provides an exceedingly simple and practical attachment which may be produced at a small cost, will be strong and durable in use, which may be easily attached to mowing machines now in general use and which will effectively accomplish its intended purpose.

Having thus described the invention what is claimed is:

The combination with a mowing machine having a dumping gate, a seat, a seat support and a bolt uniting said seat to its support, of a supporting and attaching frame comprising a vertical bar having a bent upper end apertured to receive said bolt whereby the frame is connected to the machine, an angular horizontally disposed bar having the end of one of its members fixed to the lower end of the vertical bar and its other member projecting forwardly, a diagonal brace between the vertical bar and the angular horizontal bar, a standard fixed to the forward end of the forwardly projecting member of the horizontal bar, a transversely extending horizontally disposed lever crossing said upright, said lever and upright being formed with longitudinal series of openings, a pivot arranged in said openings to mount the lever for vertical and horizontal adjustment on said standard, an adjustably mounted foot piece on the inner end of the lever, and a connection between the outer end of the lever and said dumping gate.

In testimony whereof I hereunto affix my signature in the presence of two witnesses.

CHARLES A. RICE.

Witnesses:
WM. H. DENT,
A. E. DENT.